Figure 1:
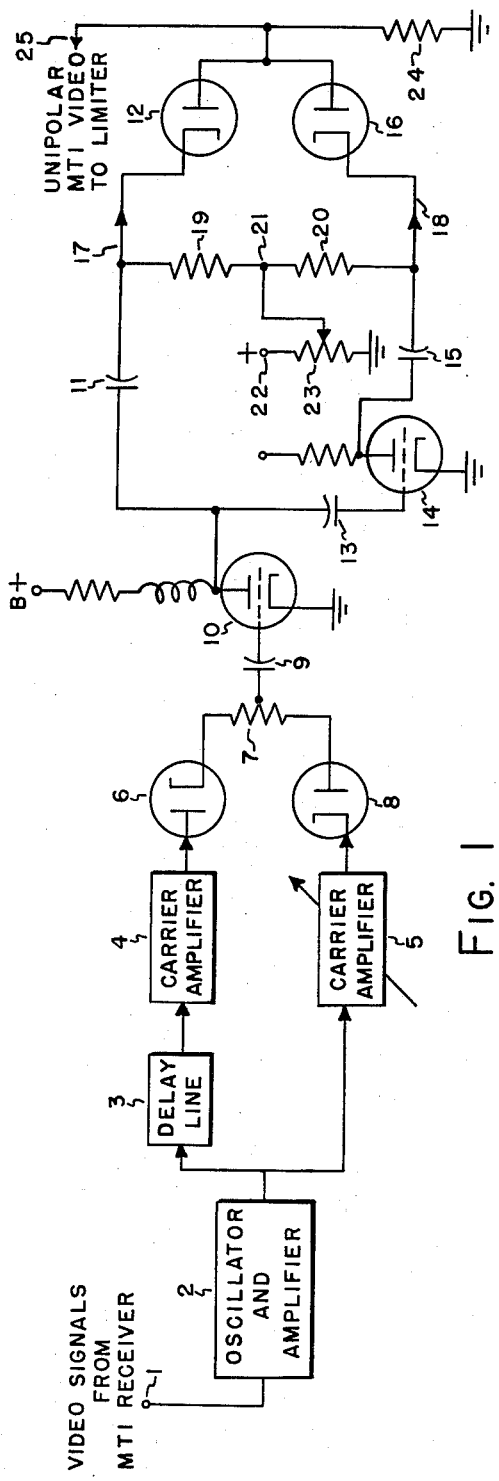

Feb. 11, 1964

J. F. BACHMANN

3,121,224

CLUTTER RESIDUE REDUCTION FOR MTI RADAR SYSTEMS

Filed Sept. 8, 1958

INVENTOR
JOHN F. BACHMANN

BY
*Killman and Keist*
ATTORNEYS

United States Patent Office 3,121,224
Patented Feb. 11, 1964

3,121,224
CLUTTER RESIDUE REDUCTION FOR MTI RADAR SYSTEMS
John F. Bachmann, Baltimore, Md., assignor to The Bendix Corporation, Towson, Md., a corporation of Delaware
Filed Sept. 8, 1958, Ser. No. 759,746
2 Claims. (Cl. 343—7.7)

This invention relates to the reduction of the slowly moving echo returns which remain on the indicator tubes of MTI radar systems after returns from stationary targets have been removed by the functioning of the MTI portion of the system.

Returns from unwanted stationary targets close to the location of the radar system (commonly known as ground clutter) have always been a problem in the operation of radar systems, since they tend to obscure the presence of returns from wanted targets. In addition, the strength of the returns from these targets tends to cause overloading and limiting of the receiver.

In the earlier days of radar STC (sensitivity time constant) circuits were employed to reduce ground clutter. These circuits applied bias voltages having waveforms which were usually shaped to give a constant signal return for targets up to a given range and then the STC bias was gradually removed to allow normal receiver sensitvity. Usually a modified inverse fourth power bias curve was used. However, since ground terrain is normally not a uniform heterogeneous mass which will return signals varying as the inverse fourth power of distance, it will be found that signal levels may vary by many db up or down in a distance of hundreds of feet. Accordingly, although conventional STC circuits can be set to reduce high signal levels resulting from ground clutter to a known limiting level, this same setting will reduce a succeeding low level signal by the same amount.

When MTI came into widespread use, especially the limiting type MTI, the use of STC was in general dropped, but with the use of shaped cascaded cancellers, better sub-clutter visibility, better cancellation ratio limitation and high powered transmitters, numerous uncancelled targets appeared on the PPIs. That these targets were not actually aircraft was indicated by their very slow movement in range and azimuth. These unwanted target returns were generally dubbed "angels" and their presence made the tracking of actual targets difficult. These returns are believed by many to be echo returns from the large birds.

The use of conventional STC has been suggested as a possible means of reducing angles. However, conventional STC cannot change the signal to clutter ratio and it is actually this ratio that determines the ability to see a moving component in clutter. The moving component may be undesired angles or desired returns of aircraft.

It is an object of this invention to provide a means for reducing undesired clutter residue in MTI radar systems. It is a further object to provide such a means which is simple and inexpensive.

These and other objects of the invention are realized by a circuit which provides two phase opposed versions of the video signal which exists after returns from stationary targets have been cancelled by operation of the MTI circuit, and applies these video signals to a paraphase detector, the input of which is biased to provide base clipping.

Figure 2:
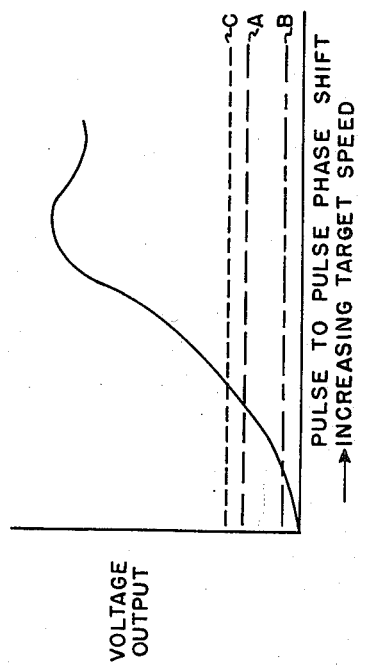

In the drawing:

FIG. 1 is a circuit diagram, partly in block form, showing a portion of the MTI circuit of a radar system and incorporating the instant invention; and, FIG. 2 is a graph showing the output characteristic of the detector of the circuit of FIG. 1.

Referring more particularly to the drawing, there is shown a terminal 1 from which video signals from an MTI receiver are applied to an oscillator and amplifier 2. The output of this circuit is applied in parallel to two channels, one of which includes a delay line 3 impressing a delay equal to the pulse repetition interval of the radar set upon the translated signal. The output of the delay line 3 is applied to a carrier amplifier 4.

The other of these parallel channels comprises a carrier amplifier 5, the amplitude of which may be varied to provide complete cancellation of returns from stationary targets.

The output of the carrier amplifier 4 is applied to the anode of a rectifier 6, the cathode of which is connected to the upper terminal of a resistor 7. The output of the amplifier 5 is applied to the cathode of a rectifier 8, the anode of which is connected to the lower terminal of the resistor 7.

The center tap of resistor 7 is coupled by a capacitor 9 to the grid of a video amplifier stage 10. The output of the amplifier 10 is coupled by way of a capacitor 11 and a conductor 17 to the cathode of the rectifier 12. The output is also coupled by a capacitor 13 to the grid of an inverting amplifier 14. The output of this amplifier is coupled by way of a capacitor 15 and a conductor 18 to the cathode of a rectifier 16. The conductors 17 and 18 are joined by a pair of series resistors 19 and 20, the junction 21 of which is connected to a tap on a resistor 23 connected between a terminal 22, to which is applied a positive bias voltage, and ground.

The anodes of the rectifiers 12 and 16 are connected together and are connected by way of a common resistor 24 to ground. They are also connected to a terminal 25 which provides unipolar MTI video output to a limiter of the circuit, which is not shown.

In the operation of the above described circuit the video signals from the MTI receiver amplitude modulate the oscillator and amplifier 2, which may be of conventional TV design, with the oscillator having a frequency of about fifteen megacycles per second. Its output signals are applied to the delay line 3 which provides a delay of one pulse interval and then applied to the carrier amplifier 4. The output of the oscillator and amplifier 2 is also applied to the carrier amplifier 5, the amplitude of which is adjusted so that the returns from stationary targets in the outputs of amplifiers 4 and 5 are of the same magnitude. These outputs are then applied to the respective rectifiers 6 and 8 and thence to the subtraction resistor 7.

The center tap of this resistor provides a video output from which returns from stationary targets have been substantially completely eliminated. To this point the circuitry which has been described is of conventional form.

The output of the subtraction resistor 7 is applied to a video amplifier 10 and its output is applied to the two parallel channels, one of which includes the capacitor 11 and conductor 17, and the other of which includes capacitor 13, inverting amplifier 14, capacitor 15, and conductor 18. Thus conductors 17 and 18 feed to the cathodes of the rectifiers 12 and 16, which constitute a paraphase detector, bipolar video signals which are in phase opposition. The conductors 17 and 18 are connected respectively to series resistors 19 and 20. To the junction of these resistors is applied, from the terminal 22, a biasing voltage of positive sign, the amplitude of which is sufficient to base clip the output of the paraphase detector by the amount necessary to eliminate angels from its output. The paraphase detector could be connected with the anodes and cathodes interchanged if desired, in which case the bias voltage would be of negative polarity.

FIG. 2 of the drawing shows the variation of detector output voltage with target speed in a typical system. A following limiting circuit and amplifier, which have not been shown, will limit maximum signal level to three volts, which level can be considered to be that shown by dashed line A.

When a bias is applied to the detector in accordance with the invention, the curve is clipped at the line B and the limiter will allow a top value three volts above this line, as indicated by line C. This graph indicates that the bias can be adjusted to reduce clutter residue and slow speed target returns without much attenuation of returns from the faster targets, which are usually the desired ones.

Especially shaped bias voltages could be generated to provide any desired output characteristic. For example, the output of a logarithmic receiver could be used to generate a bias curve varying with the amplitude of the ground clutter.

What is claimed is:

1. In an MTI radar system means for reducing clutter residue comprising means for deriving MTI video signals having eliminated therefrom returns from stationary targets, means providing a pair of parallel signal channels, signal inverting means in one of said channels, means applying said MTI video signal to said pair of channels, a paraphase detector having the outputs of said pair of channels applied thereto and means applying biasing voltage equally to said channels in a sense to clip the base portion of the output of said detector.

2. In a moving target indicator radar system including a modulator to which video returns from the radar receiver are applied, a delay line receiving the output of said modulator, a first amplifier connected to said modulator, a second amplifier connected to said delay line, first rectifying means connected to said first amplifier, second rectifying means connected to said second amplifier, said first and second rectifying means being connected so as to provide opposite output polarities, and a tapped resistor connecting the outputs of said first and second rectifying means whereby returns from stationary targets are eliminated in the video signals provided at said resistor tap; means for eliminating clutter residue from the signals at said resistor tap, comprising a third amplifier receiving the signals at said resistor tap, third rectifying means receiving signals from said third amplifier, means for inverting the phase of the output of said third amplifier, fourth rectifying means receiving said phase inverted output, said third and fourth rectifying means being connected to conduct signals of the same polarity, and means for applying a variable amount of bias to the inputs to said third and fourth rectifying means, said bias being of polarity opposite to the polarity producing conduction through said third and fourth rectifying means.

References Cited in the file of this patent

UNITED STATES PATENTS

| | | |
|---|---|---|
| 2,299,945 | Wendt | Oct. 27, 1942 |
| 2,497,693 | Shea | Feb. 14, 1950 |
| 2,714,205 | Grayson et al. | July 26, 1955 |
| 2,900,501 | Momberg | Aug. 18, 1959 |

OTHER REFERENCES

Ridenour: Radar System Engineering (vol. 1, of M.I.T. Radiation Laboratory Series) pp. 642 to 653.

Ridenour: Radar System Engineering (vol. 1, of M.I.T. Radiation Laboratory Series) pp. 633 and 634.